Patented Feb. 11, 1941

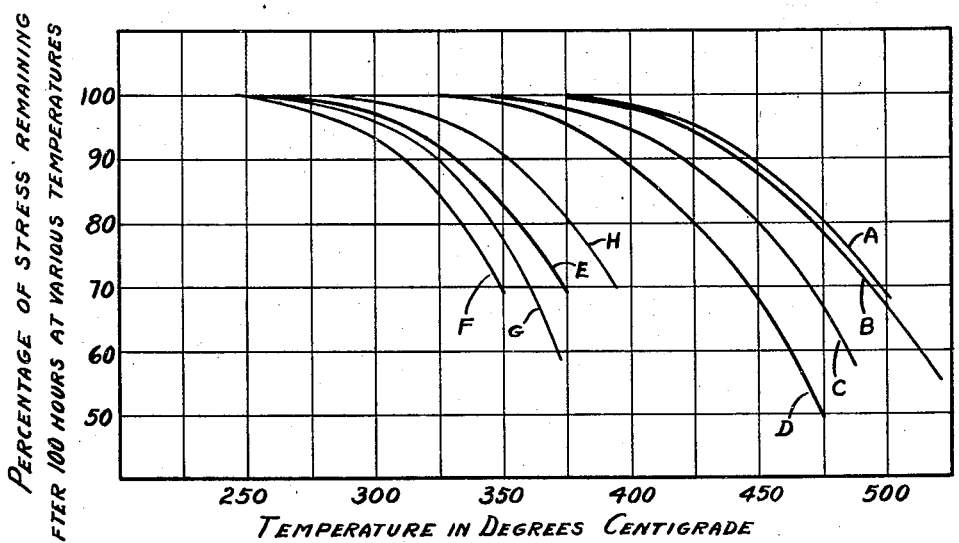

2,231,811

UNITED STATES PATENT OFFICE 2,231,811

TEMPERED GLASS ARTICLE

Jesse T. Littleton, William W. Shaver, and Howard R. Lillie, Corning, N. Y., assignors to Corning Glass Works, Corning, N. Y., a corporation of New York Application September 24, 1935, Serial No. 41,930

10 Claims. (Cl. 49—89)

This invention has for its object the production of articles of tempered glass possessing great thermal and mechanical strength and capable of retaining such strength after being subjected to elevated temperatures. Such properties are desirable in glass cooking ware and especially in ware used on top of the stove cooking as contrasted with oven cooking in that in such use the ware is subjected to localized higher temperature instead of the uniform relatively low temperature of the oven. The use of glass (as distinguished from fused quartz) has heretofore been impossible. While the production of this type of ware is the principal aim of this invention, the several features thereof lend themselves also to the production of ware in which the requirements are less exacting although heretofore unobtainable or only at a prohibitive cost.

In discussing the present invention reference will be made to the "softening point," "annealing point," and "strain point" of the glass. Softening point, as used herein, is that condition in which glass has a viscosity of $10^{7.6}$ poises; annealing point is that condition in which glass has a viscosity of $10^{13.4}$ poises; and strain point is that condition in which glass has a viscosity of $10^{14.6}$ poises. We also use the expressions softening temperature, annealing temperature, and strain temperature as defining the temperature at which any annealed glass attains the viscous conditions above recited.

It has not been known prior to this invention, as is the fact, that tempered glass undergoes a release of strain when subjected to repeated or prolonged heating at an unexpectedly low temperature and the ignorance of this fact may have been the cause of numerous failures for which no adequate explanation could be given.

The reason for this phenomenon of strain release is not definitely known but we believe it to be at least partially due to a change in the molecular structure of the glass caused by the tempering process. Our investigations have led to the conclusion that for every temperature, glass has a certain preferred molecular arrangement and if held at any given temperature for a sufficient length of time the corresponding molecular arrangement will be eventually attained. This condition is, of course, accelerated as the glass becomes less viscous and more mobile as the molecules are then more free to move about than when the glass is stiff and hard. Hence in chilling glass from a high temperature as is commonly practiced in glass tempering, its stiffness increases so rapidly that the corresponding change in molecular arrangement necessarily lags behind and thus there is produced the effect of freezing into the glass a molecular arrangement lying somewhere in the region of that prevailing immediately below the softening point, or when the glass has a viscosity of about $10^{7.6}$ poises.

In other words, in tempering glass it is necessary to first reduce its viscosity to a condition below its annealing point or $10^{13.4}$ poises and preferably near to its softening point, i. e., about $10^{7.6}$ poises. This is usually accomplished by heating the glass, the temperature being governed by the constituents entering into its composition. After reducing the viscosity of the glass, it is subjected to a sudden stiffening treatment by which its rigidity is restored. This is usually accomplished by chilling it to a temperature several hundred degrees below that to which it was previously heated. Hence the molecular arrangement of a tempered glass article will more nearly approach that possessed by the glass immediately prior to the stiffening step of the process. Based on the theory that the molecular arrangement of tempered glass approaches that of the glass prior to chilling, it can be appreciated that tempered glass will respond quite readily to a softening treatment, and hence when used as a heating vessel its molecular arrangement starts to change at temperatures far below those at which any change could be detected in a similar but annealed piece.

In tempered glass the surface layers are under compression while the interior portions are under tension and hence there are two forces working against one another, the magnitudes of which are such that upon the slightest relaxation of the rigidity of the glass, a movement toward nullification and stability ensues. Since in an annealed piece of glass containing but little strain these forces are more nearly nullified, it readily can be appreciated that the rigidity of the piece must be much more severely disturbed before any appreciable change can be detected.

Glass in top of stove service will attain temperatures lying between 150° C. and 500° C. By strain release temperature as here used we mean that temperature below which no appreciable release of strain will occur in infinite time. Obviously a glass for use at the lower of these temperatures only will be servicable when it possesses a lower strain release temperature than would be demanded when used at the higher temperature. As a practical matter however commercial top of stove ware is liable in the hands of the public to be subjected to the more severe conditions, and hence should have a high strain release temperature. In general it will be found that the strain release temperature of tempered glass is approximately 175° C. below the strain temperature of the same glass. As a result, a glass which is to be subjected to a service temperature of only 150° C. may have a strain temperature as low as 325° C. whereas where more severe service is contemplated and the glass is likely to attain a service temperature of 500° C. it should be so selected as to have a strain temperature of not less than 675° C. Hence the importance of high strain temperature in the glass.

Another glass factor entering into the production of tempered glass heating vessels for top of stove service is the thermal endurance of the article. For a predetermined degree of temper this is controlled primarily by the thermal expansion coefficient of the glass from which it is made, though the thickness of the walls of the vessel and its shape are also factors of somewhat lesser importance. Generally speaking, tempered glass articles for top of stove service must be made from a glass the thermal expansion coefficient of which must not exceed $65 \times 10^{-7}$ per degree centigrade or they will not withstand the thermal shock to which such ware is subjected in service, though if the walls of the vessel are kept thin and its shape is such that when heated no great temperature difference is experienced in different areas, a glass with an expansion coefficient somewhat in excess of that above recited may be employed. However, the lower the expansion coefficient of the glass, the greater will be the thermal endurance of the vessel and the less consideration need be given to the wall thickness and shape of the vessel.

Since the temperature-viscosity curves of glasses of different composition are not similar, there are certain working limitations that must be considered when fabricating glass vessels to be used for top of stove service. Certain glasses possessing the quality of high viscosity at temperatures reached in top of stove service also possess a rapid diminution of viscosity at higher temperatures. Other glasses possessing the first attribute demand such high temperatures to render them suitable for working that they are impracticable for use in commercial production. While glasses possessing viscosities high enough to retain their temper when used in top of stove service also demand higher working temperatures during the fabrication of the ware than do the glasses more commonly employed, it is possible by selecting a suitable glass to keep this last temperature within the range of improved but, nevertheless, commercial operation.

As the invention finds its most perfect embodiment in a glass vessel for top of stove use over an open flame, or an electrical heating unit, there is hereinafter described and claimed the procedure and apparatus which has been found most advantageous to that end, commencing with the glass suitable for such treatment.

In the drawings:

Fig. 2 is a graph illustrating the approximate strain release rates of various glasses at different temperatures.

Figure 1:
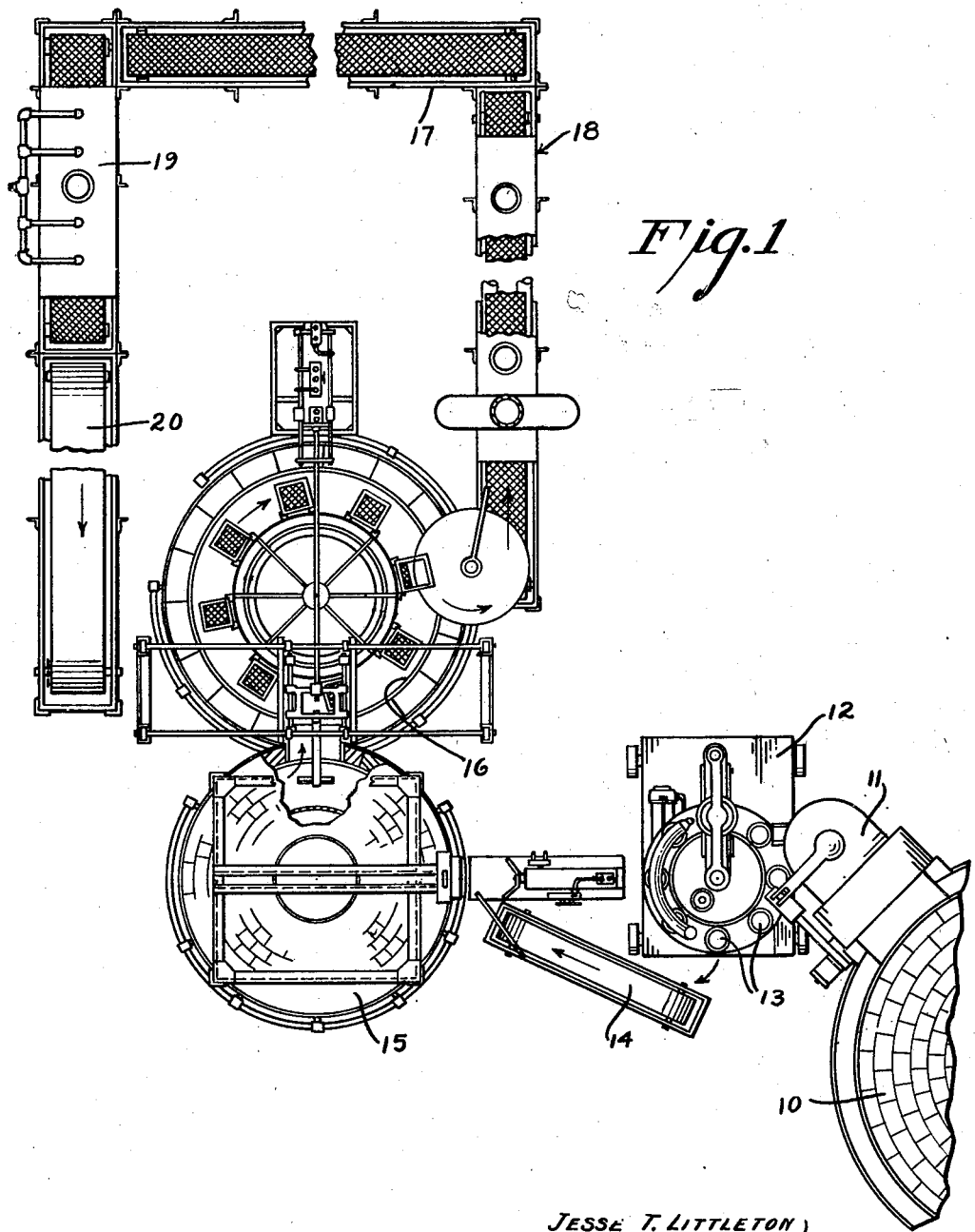
Fig. 1 is a diagrammatic plan view of a group of equipment suitable for producing tempered glass ware for top of stove service.

In carrying this invention into practice, we prefer to employ a glass the composition of which is such that it possesses the attribute of high viscosity at its strain temperature and low thermal expansion. Glass compositions suitable for this purpose and possessing these attributes are represented in the following table:

*Table I*

|  | (A) | (B) | (C) | (D) |
|---|---|---|---|---|
| $SiO_2$ | 56.4 | 60.5 | 62.5 | 57.1 |
| $B_2O_3$ | 5.0 |  | 5.2 | 12.4 |
| $Al_2O_3$ | 23.0 | 21.4 | 15.6 | 15.5 |
| $Na_2O$ | .8 | .6 |  |  |
| $CaO$ | 4.1 | 8.7 | 10.0 | 9.0 |
| $MgO$ | 10.7 | 5.8 | 5.0 | 5.0 |
| Fluorine |  | 1.5 | 1.5 | 1.0 |

It will be noted that they are all characterized by high alumina and low alkali content, and below is a table showing characteristics of glasses of the above compositions:

*Table II*

| Glass | Softening temperature | Annealing temperature | Strain temperature | Expansion |
|---|---|---|---|---|
| (A) | 929 | 726 | 684 | $38 \times 10^{-7}$ |
| (B) | 938 | 715 | 672 | $41 \times 10^{-7}$ |
| (C) | 888 | 663 | 625 | $40 \times 10^{-7}$ |
| (D) | 871 | 639 | 603 | $39 \times 10^{-7}$ |

It will be noted that all of the glasses listed above possess strain temperatures above 600° C. and therefore any of these compositions are to be preferred for the production of top of stove ware which is likely to be subjected to severe service such as permitting food to boil dry and burn, the stiffness of the glass at the temperature which it attains in service being such that any tendency of the glass to release its strain is decidedly retarded or completely arrested.

For less severe types of service, we find that satisfactory ware can be produced by employing glasses having compositions and characteristics shown in the following tables:

*Table III*

|  | (E) | (F) | (G) | (H) |
|---|---|---|---|---|
| $SiO_2$ | 80.1 | 81.0 | 71.0 | 72.5 |
| $Al_2O_3$ | 2.1 | 1.7 | 5.0 | 4.5 |
| $B_2O_3$ | 11.4 | 13.0 | 15.0 | 12.2 |
| $Na_2O$ | 5.7 | 4.4 | 7.5 | 8.4 |
| $K_2O$ | 0.6 |  | 1.5 | 2.3 |
| $Li_2O$ | 0.1 |  |  |  |

*Table IV*

| Glass | Softening temperature | Annealing temperature | Strain temperature | Expansion |
|---|---|---|---|---|
| (E) | 784 | 557 | 519 | $43 \times 10^{-7}$ |
| (F) | 816 | 561 | 517 | $32 \times 10^{-7}$ |
| (G) | 744 | 542 | 506 | $57 \times 10^{-7}$ |
| (H) | 755 | 566 | 533 | $62 \times 10^{-7}$ |

Another factor which we believe to have an important bearing on the selection of a glass to resist release of temper is the rate at which its viscosity increases as the temperature decreases, in other words, the setting rate of a glass as indicated by the difference in degrees of temperature between its softening and strain temperatures. These differences between the softening and strain temperatures of the glasses listed above are shown in Table V below:

Table V

| (A) | (B) | (C) | (D) | (E) | (F) | (G) | (H) |
|---|---|---|---|---|---|---|---|
| °C. 245 | °C. 266 | °C. 263 | °C. 268 | °C. 265 | °C. 299 | °C. 238 | °C. 222 |

Experiments have shown that the strain release characteristic of a glass is not entirely dependent on its strain temperature but is also governed to a considerable degree by the length of its setting range and while we have found it preferable that ware for top of stove service be made from a glass having a strain temperature of 500° C. and above, we have also found that the setting range of the glass preferably should not exceed 300° C. By actual test we have found glass (A) to be preferable for the production of ware for top of stove service in that it has a strain temperature well above 600° C. and a comparatively short setting range of 245° C. Glass (H) while having a strain temperature of 150° C. below that of glass (A) possesses a setting range of only 222° C. and has been found to be satisfactory as a glass from which ware for top of stove service may be produced.

While it is possible to produce ware for top of stove service from glasses having much higher coefficients of thermal expansion than those listed in Tables II and IV, we prefer that the expansion of the glass, from which our ware is made, should not exceed $65 \times 10^{-7}$ per degree centigrade. If the coefficient of expansion is in excess of this figure, it becomes necessary, in order to obtain satisfactory thermal endurance of the article, that a degree of temper be introduced into it which is such that when the article breaks, failure occurs with an explosive fracture so that small bits of glass are apt to fly in all directions. This introduces a hazard, particularly when the vessels are used in domestic service as particles of glass may lodge in food standing in other containers and cause injury to the consumer. By employing a glass having a low thermal expansion coefficient, the degree of temper necessary to produce an article having high thermal endurance is proportionately reduced and as the degree of temper is decreased the danger of the glass breaking with an explosive fracture is also decreased. Hence we prefer that the thermal expansion coefficient of the glass used in the production of our ware be as low as possible without sacrificing high strain temperature and other desirable attributes.

In producing ware for top of stove service, the following method is employed, this description being particularly directed to fabrication of glass (A) above recited. The glass is melted in a container of suitable capacity, such as a melting tank 10, from which, if desired, the molten glass is fed through a forehearth 11 and suitable feeder mechanism to a press 12 which is preferably of the rotary automatic type, though any other suitable pressing mechanism may be employed. In view of the character of the glass and particularly its high viscosity and short working range, it should be worked at a temperature at or near 1300° C. When such a feeder as before mentioned is used, the glass is separated into mold charges (gobs) which fall into molds 13 carried by the press 12 and, after pressing, the article thus formed is delivered, either by an operator who removes the articles from the press, or by means of a suitable article conveyor 14, to a temperature equalizing kiln 15 maintained at a temperature of about 900° C., or above. The glass articles in the kiln 15, having reached a suitable temperature which should be above the annealing temperature and is preferably as high as may be without resulting in loss of shape, are then removed from the kiln and introduced into a chilling medium which in the present instance is a molten salt bath confined in a suitable container 16. The bath is held at a temperature of about 525° C. and has a density near that of the glass from which the article is made. This treatment causes a sudden hardening or stiffening of the glass with an attendant increase of viscosity and not only introduces tensional and compressional strains in the glass which contribute greatly to its thermal endurance and resistance to mechanical shock, but also freezes into the glass, as it were, a molecular arrangement similar to that which is possessed when it was in its highly heated and softened condition.

After chilling the glass in the molten salt bath above described, the articles are delivered into a water bath confined in a suitable container 17 for washing by which any salt which may adhere to them is dissolved and removed. This water bath is maintained at about room temperature so that the articles are subjected to a thermal shock test and any articles which have been improperly tempered, or are otherwise defective, will break whole those possessing the correct distribution of temper will remain intact. Thus we provide an automatic selection of the properly and improperly tempered ware.

With glass (A), due to its characteristics, we find it to be necessary to employ a temperature reducing treatment before the glassware is introduced into the water washing bath. Such a treatment may be accomplished in a temperature reducing tunnel 18 in which air blasts reduce the temperature of the ware from that possessed by the chilling bath (about 500° C.) to a temperature of about 300° C. so that when the articles are introduced into the water washing bath as above recited the thermal shock test will be carried out as stated.

After washing in water as above described, the articles are transferred to a steam bath in a suitable housing 19 in which their temperature is raised to a degree where they will quickly dry after being delivered onto an inspection belt 20 along which they travel to be packaged ready for shipment and distribution.

The curves of the graph, Fig. 2, show the strain release in one hundred hours of the various glasses above referred to at temperatures ranging from 250° C. upwards. It is to be noted that in each and every case the strain release at 350° C. does not exceed 30% of the initial degree of temper introduced into the ware.

The chilling bath is preferably composed of approximately the eutectic mixture of sodium nitrate and potassium nitrate held at a temperature of above 200° C. and in certain instances as high as 525° C. or above, the temperatures and the bath constituents being varied to suit differing conditions. It is preferable, however, that the constituents be such that the density of the bath will be near that of the glass and it is essential that the bath be composed of substances which when molten and held at the desired temperatures will not attack the glass during the time that the latter is in contact with it. The use of salt baths in the tempering of glass ware is more fully described in the copending applications of William W. Shaver now issued as Patents 2,205,180 and 2,205,181.

While glassware according to the present invention may be made and tempered with equipment as hereinbefore described, such equipment forms no part of the present invention and glassware such as claimed herein may be made by hand or by any other glass forming method as may be desired.

While in the foregoing there has been shown and described the preferred embodiment of our invention, it is to be understood that minor changes in the details of construction, combination, and arrangement of parts may be resorted to without departing from the spirit and scope of our invention as claimed.

We claim:

1. A tempered glass article composed of a glass having a strain temperature of not less than 506° C. and a setting range of less than 300° C.

2. A tempered glass article composed of a glass having a strain temperature of not less than 600° C. and a setting range of less than 270° C.

3. A tempered glass article composed of a glass having a strain temperature of not less than 506° C., a setting range of less than 300° C. and a thermal expansion coefficient not greater than $62 \times 10^{-7}$ per degree centigrade.

4. A tempered glass article composed of a glass having a strain temperature of not less than 506° C., a setting range of less than 300° C. and a thermal expansion coefficient not greater than $43 \times 10^{-7}$ per degree centigrade.

5. A tempered glass article composed of a glass having a strain temperature of not less than 600° C., a setting range of less than 270° C., and a thermal expansion coefficient not greater than $62 \times 10^{-7}$ per degree centigrade.

6. A tempered glass article composed of a glass having a strain temperature of not less than 600° C., a setting range of less than 270° C., and a thermal expansion coefficient not greater than $43 \times 10^{-7}$ per degree centigrade.

7. A tempered glass article, the glass of which contains at least 50% silica, over 10% alumina, over 10% alkali earth oxides and less than 11% alkali oxides.

8. As a new article of manufacture, a tempered glass cooking dish adapted to be used directly over a high temperature localized heat source, said article being composed of a glass having a strain temperature of not less than 600° C., a setting range of less than 270° C. and a thermal expansion coefficient not greater than $43 \times 10^{-7}$ per degree centigrade, said glass article having a stress condition set therein which materially increases the thermal and mechanical strength without resulting in the danger of explosive fracture.

9. As a new article of manufacture, a tempered glass cooking dish adapted to be used directly over a high temperature localized heat source, said article being composed of a glass having a strain temperature of not less than 600° C., a setting range of less than 270° C. and a thermal coefficient of expansion not greater than $43 \times 10^{-7}$ per degree centigrade, said glass article being tempered to have tensile stress of approximately three kilograms per square millimeter set therein.

10. As a new article of manufacture, a tempered glass cooking dish adapted to be used directly over a high temperature localized heat source, said article being composed of a glass having a strain temperature of not less than 506° C., a setting range of less than 300° C. and a thermal coefficient of expansion not greater than $62 \times 10^{-7}$ per degree centigrade, said glass article being tempered to have tensile stress of approximately three kilograms per square millimeter set therein.

JESSE T. LITTLETON.
WILLIAM W. SHAVER.
HOWARD R. LILLIE.